G. W. GOODRIDGE.
CHAIN.
APPLICATION FILED OCT. 1, 1919.

1,340,765.

Patented May 18, 1920.

Inventor
GILBERT W. GOODRIDGE
By his Attorneys

UNITED STATES PATENT OFFICE.

GILBERT W. GOODRIDGE, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

CHAIN.

1,340,765.  Specification of Letters Patent.  Patented May 18, 1920.

Application filed October 1, 1919. Serial No. 327,692.

*To all whom it may concern:*

Be it known that I, GILBERT W. GOODRIDGE, a citizen of the United States of America, residing at Bridgeport, in the county of Fairfield and State of Connecticut, have invented certain new and useful Improvements in Chains, of which the following is a specification.

My invention relates to chains, and particularly to a chain adapted to be utilized as an electric wire conduit, the object of my invention being to provide a flexible tubular chain, readily varied in length and of such construction that all interior surfaces apt to come in contact with the wire cable are free from sharp edges apt to wear or injure the insulation thereof.

In the accompanying drawing—

Figure 1:
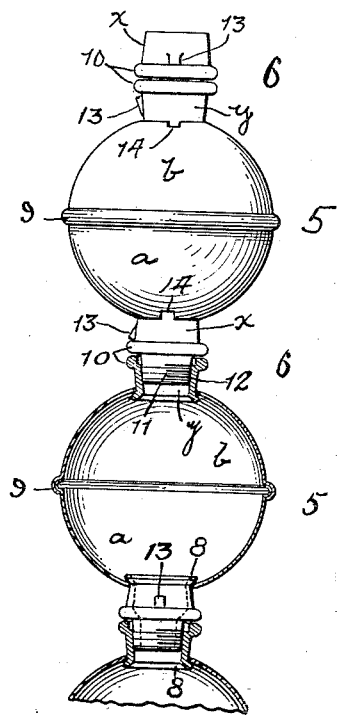
Figure 1 is a side elevation, partially in section, of portion of a chain in which my invention is embodied in one form.
Figure 2:
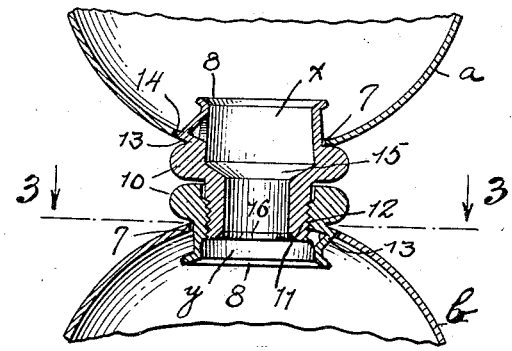
Fig. 2 is a vertical section through portion thereof, drawn to a larger scale.
Figure 3:
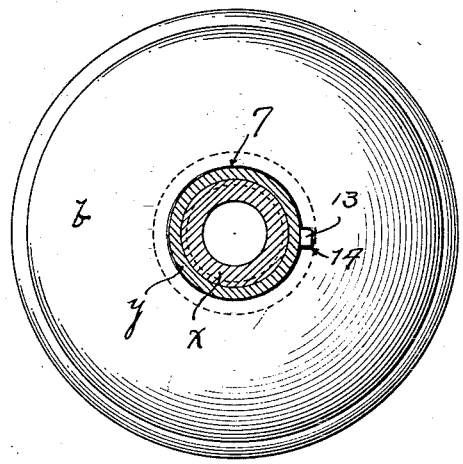
Fig. 3 is a transverse section on the line 3—3 of Fig. 2.
Figure 4:
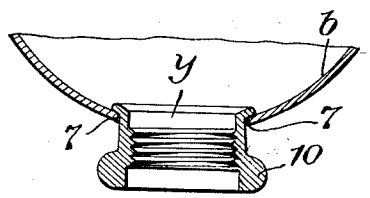
Fig. 4 is a sectional view of a detail.

The particular configuration of the members that compose the chain is of no moment, being here shown as balls or spheres 5 united by tubular links 6. The latter engage the ball members freely with lost motion in all directions to permit a free "hang" for the chain. Each link 6 is bi-partite, one part *x* being secured to one ball member, and the other part *y* to an adjacent ball member, so that in manufacture each ball member has secured thereto at opposite ends of its chain axis the respective link parts *x* and *y*. In order that these parts may be attached to a ball member, the latter is preferably made in halves *a* and *b*, each with a hole 7 on the chain axis through which the shank of the link part *x* or *y* is passed and secured in engaging position by spinning over the inner end 8 of the shank. The halves *a* and *b* of the ball member are held in position by spinning their margins together at 9. Beads 10 on the link parts *x* and *y* afford a lost motion engagement axially of the chain, and also serve as abutments which halt the link parts when their threaded sleeving areas 11 and 12 are screwed together.

Each link section *x* and *y* is preferably beveled inward from its bead 10 to the spun over flange 8. This insures great flexibility for the chain, so that it can be bent at much sharper angles than would be possible if the shanks of the link sections were straight, as well as improving the free "hang" of the chain in a graceful curve. This is important when the chain is used as a wire conduit for pendant lighting fixtures.

In order to afford convenient and self-contained means for securing the link parts *x* and *y* together, I have provided the shank of each part with a struck out lug 13 taking into a notch 14 in the margin of the ball opening 7, when the lug and notch are brought into alinement and longitudinally displaced with relation to each other. The adjacent balls thus serve as wrench grips by which the link parts *x* and *y* may be either screwed together or unscrewed, as desired. The longitudinal displacement of the balls on the links 6 frees the lugs 13 from the notches 14, whereupon the balls are again free to swivel on the links.

It will be noted that when the ball members are moved up on the link as far as the beads 10, a snug fit is secured by reason of the increased diameter of the link shank at that point. This adds to the effectiveness of the wrench connection between the parts through the lugs 13 and the notches 14.

It may also be pointed out that the spread ends 8 of the link, and the beveled areas 15 and 16 of the shank of the part *x* all present non-abrasive surfaces to the wire cable passing therethrough and thus prevent injury to its insulating covering.

Obviously it is not essential that both parts *x* and *y* of the tubular link be free with relation to the elements of the chain. It suffices, in order to secure swiveling and a free hang for the chain, to fasten one part, say the part *y*, rigidly to the part *b* of the ball, leaving only the other part *x* to swivel and have free play in the hole 7 in the half *a* of the ball. But I prefer to have both parts *x* and *y* free since they are then less apt to accidentally unscrew and open the chain. Nor is it necessary that a screw connection between the links be used, since any other suitable connection may be substituted therefor.

The ready separation of the link parts *x* and *y* enables the fixture man to adjust the length of the chain to any installation by simply cutting out or inserting a sufficient chain length to meet the needs of the situation. No special tools are required for this purpose in view of the self-contained nature of the joint. Furthermore, should it be impossible to secure the exact desired length for the chain by the insertion or removal of balls, a certain amount of longitudinal play of the balls on the links is available to take up excess length without bringing the lugs 13 and notches 14 into engagement.

Various modifications in detail of construction will readily occur to those skilled in the art, which do not depart from what I claim as my invention, it being understood that in the following claims I use the term "ball member" in a sense broad enough to include any member having a passage therethrough for an electric cable or the like.

I claim as my invention—

1. A chain having a pair of ball members, a tubular link freely interconnecting the same to permit said ball members to swivel with relation to each other, said link comprising independent parts permanently secured to the respective ball members, together with readily detachable connection between said link parts to unite the same.

2. A chain having a pair of ball members, a tubular link freely interconnecting the same to permit longitudinal play and swiveling of the ball members with relation to each other, said link comprising independent parts permanently secured to the respective ball members, together with readily detachable connection between said link parts to unite the same.

3. A chain having a pair of ball members, a tubular link freely interconnecting the same to permit longitudinal play and swiveling of the ball members with relation to each other, said link comprising independent parts permanently secured with lost motion to the respective ball members, together with readily detachable connection between said link parts to unite the same.

4. A chain having a pair of ball members, a tubular link freely interconnecting the same to permit said ball members to swivel with relation to each other, said link comprising independent parts permanently secured to respective ball members, a readily detachable connection between said link parts to unite the same, and means for temporarily locking at least one of said link parts against rotation with relation to its associated ball element to facilitate making or breaking the connection between the link parts.

5. As a chain element, a ball member having permanently secured thereto at the opposite ends of its chain axis a pair of complementary link parts, at least one of said parts being free to rotate with relation to the ball member, and each of said link parts having formed thereon means to effect a readily detachable engagement with corresponding complementary link parts permanently secured to associated balls in the chain.

6. As a chain element, a ball member having at one end a hole on the chain axis, a tubular link part passing freely through said hole and engaging the ball member with lost motion, together with means for locking said link member against rotation in said hole on the longitudinal displacement of said link therein in one direction.

7. In a chain, a ball member having a hole on the chain axis and a notch opening to said hole, a tubular link element freely engaged in said hole, and a lug on said link part adapted to engage the notch to hold said link and ball elements against relative rotation.

8. As a chain element, a ball member having engaged therewith, on the chain axis, a link member with beveled shank, said link being free for both longitudinal and rotary displacement with relation to the ball and the bevel being such as to permit greater freedom of angular displacement between the parts when the link is drawn outward than when it is moved inward with relation to the ball.

9. As a chain element, a ball member having engaged therewith, on the chain axis, a link member with beveled shank, said link being free for both longitudinal and rotary displacement with relation to the ball and the bevel being such as to permit greater freedom of angular displacement between the parts when the link is drawn outward than when it is moved inward with relation to the ball, together with means for engaging the link and ball against relative rotary displacement when the link is moved inward.

10. As a chain element, a ball member having engaged therewith, on the chain axis, a link member with beveled shank, said link being free for both longitudinal and rotary displacement with relation to the ball and the bevel being such as to permit greater freedom of angular displacement between the parts when the link is drawn outward than when it is moved inward with relation to the ball, together with means at the outer end of the link member for engaging a coöperating link member carried by an adjacent ball member of the chain.

In testimony whereof I have signed my name to this specification.

GILBERT W. GOODRIDGE,